| United States Patent [19] | [11] Patent Number: 4,597,893 |
| Byford et al. | [45] Date of Patent: Jul. 1, 1986 |

[54] DISPERSANT COMPOSITION

[75] Inventors: Derek C. Byford, Virginia Water; Peter J. Green, Sunbury-on-Thames; Alun Lewis, Hounslow, all of England

[73] Assignee: The British Petroleum Company p.l.c., London, England

[21] Appl. No.: 501,367

[22] Filed: Jun. 6, 1983

[30] Foreign Application Priority Data

Jun. 12, 1982 [GB] United Kingdom ............... 8217136

[51] Int. Cl.$^4$ .............................................. B01F 17/00
[52] U.S. Cl. ................... 252/354; 210/925; 252/312; 252/356; 252/357
[58] Field of Search ............... 252/312, 354, 356, 357; 210/925

[56] References Cited

U.S. PATENT DOCUMENTS

| 3,793,218 | 2/1974 | Canevari | 252/312 |
| 3,810,835 | 5/1974 | Ferm | 252/312 |
| 3,959,134 | 5/1976 | Canevari | 252/312 |
| 3,998,733 | 12/1976 | Blanchard et al. | 252/357 |
| 4,469,603 | 9/1984 | Lepain et al. | 252/354 |

FOREIGN PATENT DOCUMENTS

| 106526 | 4/1984 | European Pat. Off. |
| 2479251 | 3/1980 | France |
| 1419803 | 12/1975 | United Kingdom |

OTHER PUBLICATIONS

Chemical Abstract, Abstract No. 81,389, vol. 79, French Pat. No. 2145417.

Primary Examiner—Paul Lieberman
Assistant Examiner—Robert A. Wax
Attorney, Agent, or Firm—Morgan, Finnegan, Pine, Foley & Lee

[57] ABSTRACT

A dispersant composition suitable for dispersing crude oil or petroleum products floating on the surface of water comprises a combination of a selected non-ionic surfactant and an anionic surfactant in a suitable solvent. The non-ionic surfactant is an ester of a polyalkoxylated sorbitol or sorbitan and a fatty acid. The anionic surfactant is selected from the group comprising calcium sulphonate, magnesium sulphonate, sodium sulphonate, triethanolamine sulphonate and isopropylamine sulphonate. Suitable solvents are $C_5$ to $C_{10}$ alcohols, glycols and glycol ethers. The dispersant composition is particularly suitable for use in cold, low salinity water.

10 Claims, No Drawings

DISPERSANT COMPOSITION

The present invention relates to a dispersant composition suitable for dispersing crude oil or petroleum products spilt on water, particularly sea water in the polar regions.

One of the most common methods of treating oil spilt at sea is to spray a detergent composition onto the oil and to agitate the spilt oil and water so as to form an emulsion of the oil and water. The emulsion formed is diluted in water and consequently the spilt oil is dispersed as fine droplets thus reducing its effect on the marine environment and assisting its biodegradation.

In recent years there has been an increase in the exploration and production of oil in Arctic areas. However, few dispersant compositions have been developed which are effective in very cold, low salinity sea water.

Various compositions containing non-ionic or anionic surfactants have been proposed for use as oil spill dispersants. Compositions comprising mixtures of non-ionic and anionic surfactants are also known. For example, two commercially available dispersant compositions contain mixtures of polyethoxylated sorbitan ester, a non-ionic surfactant, and sodium dioctyl sulphosuccinate, an anionic surfactant. Although such dispersants may be effective in sea water of average salinity, i.e. about 30 to 35 parts per thousand by weight, at moderate temperature e.g. above 0° C., they are much less effective in low temperatures, e.g. 0° C. or below, and in low salinity water such as is found in the vicinity of ice in polar regions.

The applicants have found that a dispersant composition comprising selected non-ionic and anionic surfactants combined in a suitable solvent is effective in cold, low salinity water.

Thus, according to the present invention a dispersant composition suitable for dispersing crude oil or petroleum products floating on the surface of water comprises;

(A) 8 to 58% by weight of a non-ionic surfactant which is an ester of a polyalkoxylated sorbitol or sorbitan and a fatty acid having from 12 to 20 carbon atoms, (B) 7 to 53% by weight of an anionic surfactant which is selected from the group comprising calcium sulphonate, magnesium sulphonate, sodium sulphonate, triethanolamine sulphonate and isopropylamine sulphonate, (C) 85 to 30% by weight of a solvent which comprises one or more alcohol, glycol or glycol-ether each of which has from 5 to 10 carbon atoms, and (D) 0 to 15% by weight water, the ratio of non-ionic surfactant to anionic surfactant being from 5:1 to 1:3.

The non-ionic surfactant may be formed by conventional methods e.g. by condensing a polyalkoxylated sorbitol or sorbitan with a fatty acid. The polyalkoxylated sorbitol or sorbitan is preferably polyethoxylated sorbitol or sorbitan containing 5 to 55 moles of ethylene oxide per mole of sorbitol or sorbitan. The fatty acid may be saturated or unsaturated e.g. mixtures of fatty acids may be used e.g. esterified tall oil acids. The Hydrophilic-Lipophilic Balance (HLB) of the non-ionic surfactant is preferably from 9 to 12. Particularly suitable non-ionic surfactants are polyoxyethylene sorbitol hexaoleate, polyoxyethylene sorbitan monooleate and polyoxyethylene sorbitan trioleate. The non-ionic surfactant may be a mixture of two or more of the sorbitol or sorbitan esters.

The anionic surfactants suitable for use in the dispersant composition according to the present invention are salts of alkyl aryl sulphonic acids wherein the alkyl group has from 8 to 16 carbon atoms preferably 12 carbon atoms. Suitably the surfactant is a salt of an alkyl benzene sulphonic acid.

Preferably the ratio of non-ionic surfactant to anionic surfactant in the composition is from 2:1 to 2:3.

Suitable $C_5$ to $C_{10}$ glycol-ether solvents include ethylene glycol monobutyl ether and dipropylene glycol monomethyl ether.

Although $C_5$ to $C_{10}$ alcohols, $C_5$ to $C_{10}$ glycols and $C_5$ to $C_{10}$ glycol-ether solvents may each be used alone in the compositions according to the present invention, mixtures comprising a glycolether solvent and one or more $C_7$ to $C_{10}$ alcohols are particularly effective. Such solvent mixtures can improve the efficiency of the dispersant compositions. The solvent preferably comprises 10 to 42% by weight of the one or more $C_7$ to $C_{10}$ alcohols. Suitable alcohols include mixtures of decanol isomers and mixtures of straight and branched chain primary $C_7$, $C_8$ and $C_9$ aliphatic and alicyclic alcohols.

The presence of water in the compositions according to the invention reduces the temperature at which the composition becomes cloudy. Preferably the amount of water is from 7.5 to 10% by weight of the total composition.

The dispersant composition according to the present invention may be applied to spilt oil by conventional methods. For example, the dispersant may be simply sprayed onto the surface of the spilt oil. The mixture formed by applying the dispersant to the oil is preferably agitated. This agitation may be achieved by the action of hosing or spraying the dispersant composition into the oil. At sea natural wave motion may provide agitation. Ships and boats may be driven through the mixture providing agitation by their passage and the action of their propellors. Also a surface agitator may be towed through the oil and dispersant mixture.

The dispersant compositions according to the present invention may be used over a relatively wide temperature range e.g. a water temperature of from −2° to 40° C. and may be used in fresh water as well as sea water. However, it is their relatively high efficiency in very cold, low salinity water which is of particular interest.

The invention is further described by the following examples. All proportions are by weight unless otherwise stated.

EXAMPLE 1

Five dispersants according to the present invention were prepared having the following compositions;

Dispersant A 37.5%—polyoxyethylene sorbitol hexaoleate, containing 40 moles of ethylene oxide sold by Atlas Chemical Industries under the Trade Name ATLOX G1086. (ATLOX is a Registered Trade Mark).

22.5%—isopropylamine dodecyl benzene sulphonate sold by Diamond Shamrock under the Trade Name Arylan PWS.

40%—ethylene glycol monobutyl ether sold under the Trade
Name Butyl Oxitol by Oxirane Limited.

Dispersant B 37.5%—ATLOX G1086, the polyoxyethylene sorbitol hexaoleate used in Dispersant A. 22.5%—solution of 70% by weight calcium dodecyl benzene sulphonate in butanol sold by Tensia S. A. under the Trade Name Tensimul 11.

40%—Butyl Oxitol solvent as used in Dispersant A.

Dispersant C

Composition as for Dispersant B except that the butanol was removed from the solution of calcium dodecyl benzene sulphonate, by distillation, and replaced with Butyl Oxitol before the composition was prepared.

Dispersant D

30%—polyoxyethylene sorbitan trioleate, containing 20 moles of ethylene oxide sold under the Trade Name, Tween 85, by Atlas Chemical Industries.

30%—Tensimul 11, the solution of calcium dodecyl benzene sulphonate used in Dispersant B.

40%—Butyl Oxitol solvent as used in Dispersant A.

Dispersant E

Composition as for Dispersant D except that the butanol was removed from the solution of calcium dodecyl benzene sulphonate, by distillation, and replaced with Butyl Oxitol before the composition was prepared.

Each of the dispersant Compositions A, B and D was tested using the Mackay Dispersant Effectiveness Test with 175° C. topped Lago Medio crude oil at 0° C.

The Mackay Dispersant Effectiveness test is described in a paper by D. Mackay of the Institute of Environmental Studies, University of Toronto, Canada entitled "Effectiveness of Oil Spill Dispersants—Development of a Laboratory Method and Results for Selected Commercial Products" and also in a paper given at the 1981 Oil Spill Conference at Atlanta, March 1981 entitled "The Laboratory Determination of Dispersant Effectiveness—Method Development and Results" by D. Mackay and Foon Szeto.

The Mackay test is carried out in a 30 cm diameter vessel containing six litres of water. Air is blown tangentially over the water surface to create turbulence, the velocity of the air being controllable in order to vary the amount of turbulence. 10 mls of oil and 0.1 mls of the dispersant composition are added to the surface of the oil within a 7 cm diameter containment ring. Dispersion of the oil occurs when the containment ring is removed. After 10 minutes of agitating the water surface with the air current, a 500 ml sample of the oil-water mixture is withdrawn at half the water depth and analysed for oil content by solvent extraction and colorimetry. The percentage of oil dispersed is then calculated. The results of the test are given in Table 1. Two commercially available dispersant compositions were also tested in the same manner and the results are also given in Table 1.

Commercial Product A is believed to contain,
42%—polyethoxylated sorbitan ester
17%—sodium dioctyl sulphosuccinate
36%—ethylene glycol monobutyl ether
5%—water Commercial Product B is believed to contain:
35%—polyethoxylated sorbitan ester
25%—sodium dioctyl sulphosuccinate
15%—ethylene glycol monobutyl ether
25%—water Each of the dispersant Compositions A, B and D and each of the two commercially available dispersants was also tested using the Mackay test and the Labofina test with a 245° C. topped Kuwait crude oil. Dispersant Compositions C and E were tested using the Labofina test. The Labofina test is described in "Factors Affecting the Efficiency of Dispersants" a Warren Spring Laboratory Report No. LR 363 (OP), August 1980, by Martinelli and Lynch.

The method comprises a revolving flask emulsification test. 5 ml of oil is floated on 250 ml of sea water contained in a separating funnel (nominal capacity 250 ml, actual capacity approximately 300 ml). The dispersant is added as evenly as possible to the oil layer using a syringe. The funnel is then stoppered and rotated at 34+2 rpm for 5 minutes in a cradle arrangement attached to a motor. The flask is then unstoppered and allowed to stand for one minute before 50 ml of the oil-water mixture is run off into a graduated flask. The oil is then extracted with chloroform, the solution is dried over anhydrous sodium sulphate and the oil content determined by UV/visible spectrophotometry. The result is expressed as the percentage of the maximum possible amount of oil which would have been present had the oil been evenly distributed throughout the water at the time of sampling. Both tests were carried out at 10° C. and the ratio of dispersant to crude oil used in the Labofina test was 0.2 cm$^3$ to 5 cm$^3$. The results of these tests are also given in Table 1.

TABLE 1

Effectiveness of Dispersant Compositions of the Invention Compared with Commercial Products

| Dispersant | Lago Medio Crude Oil Mackay Test | Kuwait Crude Oil Mackay Test | Kuwait Crude Oil Labofina Test |
|---|---|---|---|
| A | 82 | 90 | 83 |
| B | 83 | 93 | 85 |
| C | — | — | 88 |
| D | 86 | 96 | 74 |
| E | — | — | 77 |
| Commercial Product A | 46 | 67 | 65 |
| Commercial Product B | 78 | 92 | 66 |

The results given in Table 1 show that the compositions according to the invention are effective dispersants for both the crude oils using the test methods, and that they perform as well as or better than the commercial products in these tests.

Replacement of the butanol in the solution of calcium dodecyl benzene sulphonate (Compositions C and E) increases the Pensky Martens flash point without adversely affecting the dispersant performance as measured by the Labofina test.

EXAMPLE 2

Compositions A and C, as prepared in Example 1, were tested in water of different salinity using the Labofina test method with a Lago Medio crude oil topped at 175° C. The test was carried out at 20° C. using 0.1 cm$^3$ of dispersant to 5 cm$^3$ of crude oil. The water used in the tests was natural sea water and a mixture of 17% sea water in fresh water. The results are given in Table 2 along with the results obtained using the Commercial Products A and B.

TABLE 2

Effect of Water Salinity on the Labofina Efficiency of Dispersants

| Dispersant | Natural Sea Water | 17% Sea Water, 83% Fresh Water |
| --- | --- | --- |
| A | 53 | 59 |
| C | 72 | 70 |
| Commercial Product A | 46 | 27 |
| Commercial Product B | 57 | 36 |

The results indicate that there is little or no decrease in the efficiency of the dispersant Compositions A or C when the sea water is mixed with 83% fresh water. In comparison the efficiency of the commercial products is reduced by about 40% when the sea water is mixed with fresh water.

EXAMPLE 3

Samples of Compositions A, D and E prepared in Example 1 and a sample of Commercial Product B were cooled at 5° C. intervals, maintaining the temperature for several hours at each interval before reducing it by a further 5° C. The commercial product froze at $-20°$ C., whereas Compositions A, D and E were still liquid at $-40°$ C. although the compositions became cloudy at temperatures between $-25°$ and $-40°$ C.

EXAMPLE 4

Further solvent was added to three samples of Dispersant C as prepared in Example 1 such that the surfactant content was reduced to 44.3% by weight. The solvents added were (a) more Butyl Oxitol, (b) Alphanol 79, a mixture of straight and branched chain primary $C_7$, $C_8$ and $C_9$ aliphatic and alicyclic alcohols sold by ICI Limited (ALPHANOL is a Registered Trade Mark) and (c) Iso-decanol a mixture of decanol isomers sold by ICI Limited. Each of the dispersant compositions was tested using the Labofina test method as described in Example 1, except that the funnel was rotated for only 2 minutes. The oil used was a medium fuel oil. The test was carried out at 20° C. using 0.1 cm³ of dispersant to 5 cm³ of oil. The results are shown in Table 3. Compositions (b) and (c) which had solvent mixtures comprising long chain alcohols and a glycol-ether solvent performed better than composition (a) which contained only the glycol-ether as solvent.

TABLE 3

Effect of $C_7$ to $C_{10}$ alcohols on the Labofina Efficiency of Dispersants

| Dispersant | Atlox G1086 (% wt) | Calcium dodecyl benzene sulphonate (% wt) | Solvent (% wt) Butyl Oxitol | Solvent (% wt) Alphanol 79 | Solvent (% wt) ISO-DECANOL | Labofina Efficiency (%) |
| --- | --- | --- | --- | --- | --- | --- |
| a | 31.2 | 13.1 | 55.7 | — | — | 65 |
| b | 31.2 | 13.1 | 39 | 16.7 | — | 86 |
| c | 31.2 | 13.1 | 39 | — | 16.7 | 92 |

EXAMPLE 5

A dispersant composition was prepared having the following composition;

31% wt—ATLOX G 1086, the polyoxyethylene sorbitol hexaoleate, as used in Dispersant A of Example 1

22% wt—a solution of 60% wt calcium dodecyl benzene sulphonate in dipropylene glycol monomethyl ether supplied by Tensia SA under the Trade Name Tensimul 11-DPM 60

20% wt—Alphanol 79, the mixture of $C_7$, $C_8$ and $C_9$ alcohols used in Example 4

19% wt—dipropylene glycol monomethyl ether sold under the Trade Name Dowanol DPM by Dow Chemical Company (DOWANOL is a Registered Trade Mark) and 8% wt—distilled water.

The composition was tested using the Labofina test as described in Example 1 except that the funnel was rotated for only 2 minutes. The oil used was a 175° C. topped Lago Medio crude oil and a North Slope crude oil artificially weathered by evaporation at ambient temperature to a weight loss of 11%. The test was carried out at 0° C. using 0.1 cm³ of dispersant to 5 cm³ of crude oil. The composition was tested both in natural sea water and in fresh water. The average Labofina efficiencies are given in Table 4.

Commercial Product A as used in Example 1 was also subjected to the Labofina test using the same oil and the average efficiencies are given in Table 4 for comparison. The results show that the composition according to the invention is as effective in fresh water as in sea water. The Commercial Product is not only less effective than the composition according to the invention in either fresh water or sea water but is also less effective in fresh water than in sea water.

TABLE 4

Labofina efficiencies at 0° C. - Sea and Fresh Water

| | Labofina Efficiency (%) at 0° C. (Average result) 0.1 mls Disp:5 mls oil | | | |
| --- | --- | --- | --- | --- |
| | 175° C. Topped Lago Medio | | Weathered North Slope | |
| Dispersant | Seawater | Fresh | Seawater | Fresh |
| According to Example 5 | 72 | 64 | 78 | 78 |
| Commercial Product A | 39 | 7 | 62 | 12 |

EXAMPLE 6

A test was carried out to assess the effectiveness of the composition, according to the invention, as prepared in Example 5 for dispersing oil spilt on sea water in the presence of ice.

The test was carried out in a tank of natural sea water at 0° C. 2 kg of ice in the form of pieces approximately 0.5 cm thick was placed within a 15 cm diameter containment ring at the surface of the sea water. 10 cm³ of 225° C. topped Lago Medio crude oil was added to the ice and water within the containment ring. 0.5 g of the dispersant composition was sprayed over the water, ice and oil within the containment ring. The ring was removed and the mixture agitated using a simulated wave action for 10 minutes.

A sample of the oil-water mixture was withdrawn from the tank and analysed for oil content in a similar manner as for the Mackay test.

The percentage of the oil dispersed i.e. the efficiency of the composition was 97%. For comparison, Commercial Product A as used in Example 1 was subjected to the same test. The efficiency of this composition was only 21%.

The test indicates that the composition according to the invention is effective for dispersing oil in cold water in the presence of ice.

We claim:

1. A dispersant composition suitable for dispersing crude oil or petroleum products floating on the surface of water comprises;
(A) 8 to 58% by weight of a non-ionic surfactant which is an ester of a polyalkoxylated sorbitol or sorbitan and a fatty acid having from 12 to 20 carbon atoms,
(B) 7 to 30% by weight of an anionic surfactant which is selected from the group comprising calcium sulphonate, magnesium sulphonate, sodium sulphonate, triethanolamine sulphonate and isopropylamine sulphonate,
(C) 85 to 30% by weight of a solvent which comprises one or more alcohol, glycol or glycol-ether each of which has from 5 to 10 carbon atoms, and
(D) 0 to 15% by weight water,
the ratio of non-ionic surfactant to anionic surfactant being from 5:1 to 1:2.

2. A dispersant composition as claimed in claim 1 in which the ratio of non-ionic surfactant to anionic surfactant is from 2:1 to 2:3.

3. A dispersant composition as claimed in claim 1 in which the polyalkoxylated sorbitol or sorbitan used to prepare the non-ionic surfactant contains from 5 to 55 moles of ethylene oxide.

4. A dispersant composition as claimed in claim 3 in which the nonionic surfactant is selected from the group comprising polyoxyethylene sorbitol hexaoleate, polyoxyethylene sorbitan monooleate and polyoxyethylene sorbitan trioleate.

5. A dispersant composition as claimed in claim 1 in which the anionic surfactant is calcium dodecyl benzene sulphonate or isopropylamine dodecyl benzene sulphonate.

6. A dispersant composition as claimed in claim 1 in which the solvent comprises a glycol-ether and one or more $C_7$ to $C_{10}$ alcohols.

7. A dispersant composition as claimed in claim 6 in which the one or more $C_7$ to $C_{10}$ alcohols comprises 10 to 42% by weight of the total weight of the solvent.

8. A dispersant composition as claimed in claim 6 in which the glycol-ether is ethylene glycol monobutyl ether or dipropylene glycol monomethyl ether.

9. A dispersant composition as claimed in claim 1 which comprises 7.5 to 10% water by weight of the total weight of the composition.

10. A dispersant composition suitable for dispersing crude oil or petroleum products floating on the surface of water comprising:
(a) 30–37.5% by weight of a non-ionic surfactant which is an ester of a polyalkoxylated sorbitan and a fatty acid having from 12 to 20 carbon atoms,
(b) 22 to 30% by weight of an anionic surfactant which is selected from the group comprising calcium sulphonate, magnesium sulphonate, sodium sulphonate, triethanolamine sulphonate and isopropylamine sulphonate,
(c) 0 to 15% by weight water,
(d) the remainder being a solvent which comprises one or more alcohol, glycol or glycolether each of which has from 5 to 10 carbon atoms;
the ratio of non-ionic surfactants to anionic surfactant being from 1:1 to 1.67:1.

* * * * *